(12) United States Patent
Robertson et al.

(10) Patent No.: US 8,920,773 B2
(45) Date of Patent: Dec. 30, 2014

(54) SYSTEMS AND METHODS FOR METAL RECOVERY

(71) Applicant: Freeport-McMoran Corporation, Phoenix, AZ (US)

(72) Inventors: Joanna M. Robertson, Thatcher, AZ (US); Thomas R. Bolles, Tucson, AZ (US); Wayne W. Hazen, Lakewood, CO (US); Lawrence D. May, Westminster, CO (US); Jay C. Smith, Pearl River, LA (US); David R. Baughman, Golden, CO (US)

(73) Assignee: Freeport Minerals Corporation, Phoenix, AZ (US)

(*) Notice: Subject to any disclaimer, the term of this patent is extended or adjusted under 35 U.S.C. 154(b) by 86 days.

(21) Appl. No.: 13/716,819

(22) Filed: Dec. 17, 2012

(65) Prior Publication Data

US 2013/0156661 A1 Jun. 20, 2013

Related U.S. Application Data

(60) Provisional application No. 61/577,995, filed on Dec. 20, 2011.

(51) Int. Cl.

| | | |
|---|---|---|
| *C22B 1/00* | (2006.01) | |
| *C22B 1/02* | (2006.01) | |
| *C22B 23/00* | (2006.01) | |
| *C25C 1/00* | (2006.01) | |
| *C22B 3/02* | (2006.01) | |
| *C22B 3/14* | (2006.01) | |
| *C22B 3/12* | (2006.01) | |
| *C25C 1/12* | (2006.01) | |
| *C25C 7/02* | (2006.01) |

(52) U.S. Cl.
CPC ............ *C22B 1/02* (2013.01); *C22B 23/005* (2013.01); *C25C 1/00* (2013.01); *C22B 3/02* (2013.01); *C22B 3/14* (2013.01); *C22B 3/12* (2013.01); *C25C 1/12* (2013.01); *C25C 7/02* (2013.01)
USPC .......... 423/658.5; 423/11; 423/20; 423/21.1; 423/22; 423/49; 423/53; 423/54; 423/101; 423/109; 423/140; 423/150.1; 423/32; 423/34; 423/41

(58) Field of Classification Search
None
See application file for complete search history.

(56) References Cited

U.S. PATENT DOCUMENTS 3,457,037 A * 7/1969 Aramendia et al. ............ 423/86
3,799,764 A * 3/1974 Opie et al. ...................... 75/419

* cited by examiner

*Primary Examiner* — Steven Bos
(74) *Attorney, Agent, or Firm* — Snell & Wilmer L.L.P.

(57) ABSTRACT

Various embodiments provide a process roasting a metal bearing material under oxidizing conditions to produce an oxidized metal bearing material, roasting the oxidized metal bearing material under reducing conditions to produce a roasted metal bearing material, leaching the roasted metal hearing material in a basic medium to yield a pregnant leach solution, conditioning the pregnant leach solution to thrill a preprocessed metal bearing material; and leaching the preprocessed metal bearing material in acid medium.

20 Claims, 6 Drawing Sheets

SYSTEMS AND METHODS FOR METAL RECOVERY

CROSS REFERENCE TO RELATED APPLICATIONS

This application is a nonprovisional application of and claims priority to U.S. Provisional Application Ser. No. 61/577,995, entitled "SYSTEMS AND METHODS FOR METAL RECOVERY" which was filed on Dec. 20, 2011. The aforementioned application is hereby incorporated by reference herein in its entirety.

FIELD OF INVENTION

The present disclosure relates, generally, to systems and methods fix recovering metal values from metal bearing materials, and more specifically, to systems and methods for processing acid consuming ores.

BACKGROUND OF THE INVENTION

Hydrometallurgical treatment of metal bearing materials, such as copper ores, concentrates, and other metal bearing materials, has been well established for many years. Typically, conventional hydrometallurgical processes for copper recovery involve leaching metal bearing materials with an acidic solution, either atmospherically or under conditions of elevated temperature and pressure. The resultant process stream—the pregnant leach solution—is recovered, and a processing step such as solution extraction is used to form a highly concentrated and relatively pure metal value containing aqueous phase. One or more metal values may then be electrowon from this aqueous phase.

Certain ores consume a relatively high amount of acid during acidic leaching. Thus, highly acid consuming ores have conventionally been more expensive to process through acidic leaching. Highly acid consuming copper containing ores include copper carbonates, such as azurite and malachite, among other types of minerals.

Certain ores and/or flotation tailings contain a mix of oxides and sulfides of one or more metals associated with highly acid consuming gangue materials such as carbonates. These mixed materials may be problematic in acid leaching because of the highly acid consuming nature of the gangue minerals and because sulfide minerals leach more slowly and less completely than oxide minerals, causing low metal recovery and plant design complications.

Accordingly, processes that reduce the amount of acid required for leaching highly acid consuming ores would be advantageous. Additionally, processes that allow for metal recovery from highly acid consuming ores without the need for acid leaching would be advantageous.

SUMMARY OF THE INVENTION

Accordingly, the present invention provides systems and methods for metal value recovery. In various embodiments, a process is provided comprising roasting a metal bearing material under oxidizing conditions to produce an oxidized metal bearing material, roasting the oxidized metal bearing material under reducing conditions to produce a reduced metal bearing material, leaching the roasted metal bearing material in a basic medium, to yield a pregnant leach solution, and conditioning the pregnant leach solution to form a preprocessed metal bearing material. For example, and as further described herein, conditioning methods may include solvent extraction, ion exchange, electrowinning, precipitation, and/or crystallization. Recovery of metals from the preprocessed metal bearing solution may be accomplished by several means, including one or a combination of re-dissolution of precipitates or crystals, solvent extraction, and electrowinning. Further, various embodiments of the present invention provide a process comprising one or more of oxidizing sulfides of copper and cobalt by roasting under an oxygen containing gas to produce an oxidized copper and cobalt bearing material, reducing copper and cobalt by roasting the oxidized copper bearing material under a reducing gas which may comprise hydrogen, carbon monoxide, another reducing gas such as those described herein, and/or mixtures thereof, to produce a roasted copper and cobalt bearing material, quenching the roasted material in a solution which may contain free ammonia and ammonium compounds, leaching the roasted copper and cobalt bearing material using free ammonia and an ammonium complex to yield a pregnant leach solution, recovering copper by solvent extraction and precipitating cobalt containing compounds from the solvent extraction raffinate solution, and electrowinning the copper. In various embodiments, upon generation of the pregnant leach solution, copper and cobalt compounds may be crystallized or precipitated from the pregnant leach solution. These copper and cobalt compounds may be re-dissolved, either separately or together, in an acid medium. The resulting solution(s) will contain dissolved copper or dissolved cobalt or a mixture of the two. Recovery of copper or cobalt may be accomplished by one or more processes including solvent extraction, precipitation, and electrowinning.

Still in further exemplary embodiments, a system is provided comprising one or more of a two stage roaster configured with stages which operate in both an oxidizing mode and a reducing mode by selectively receiving oxygen gas and/or at least one of carbon monoxide and hydrogen gas, wherein the roaster is configured to heat a metal bearing material to temperatures of from about 200° C. to about 800° C., a quench vessel configured to receive a roasted metal bearing material from the roaster, a basic leaching vessel or vessels in series configured to receive quenched metal bearing material from the quench vessel, one or more solvent extraction stages configured to receive a high pH solution containing copper and cobalt, one or more wash stages configured to receive loaded organic from the solvent extraction stage, one or more stripping stages configured to receive washed loaded organic from the wash stage, a copper electrowinning circuit configured to receive rich electrolyte solution from the stripping stage, and a cobalt precipitation vessel configured to receive raffinate from the solvent extraction stage.

Further areas of applicability will become apparent from the detailed description provided herein. It should be understood that the description and specific examples are intended for purposes of illustration only and are not intended to limit the scope of the present invention.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

Figure 1:
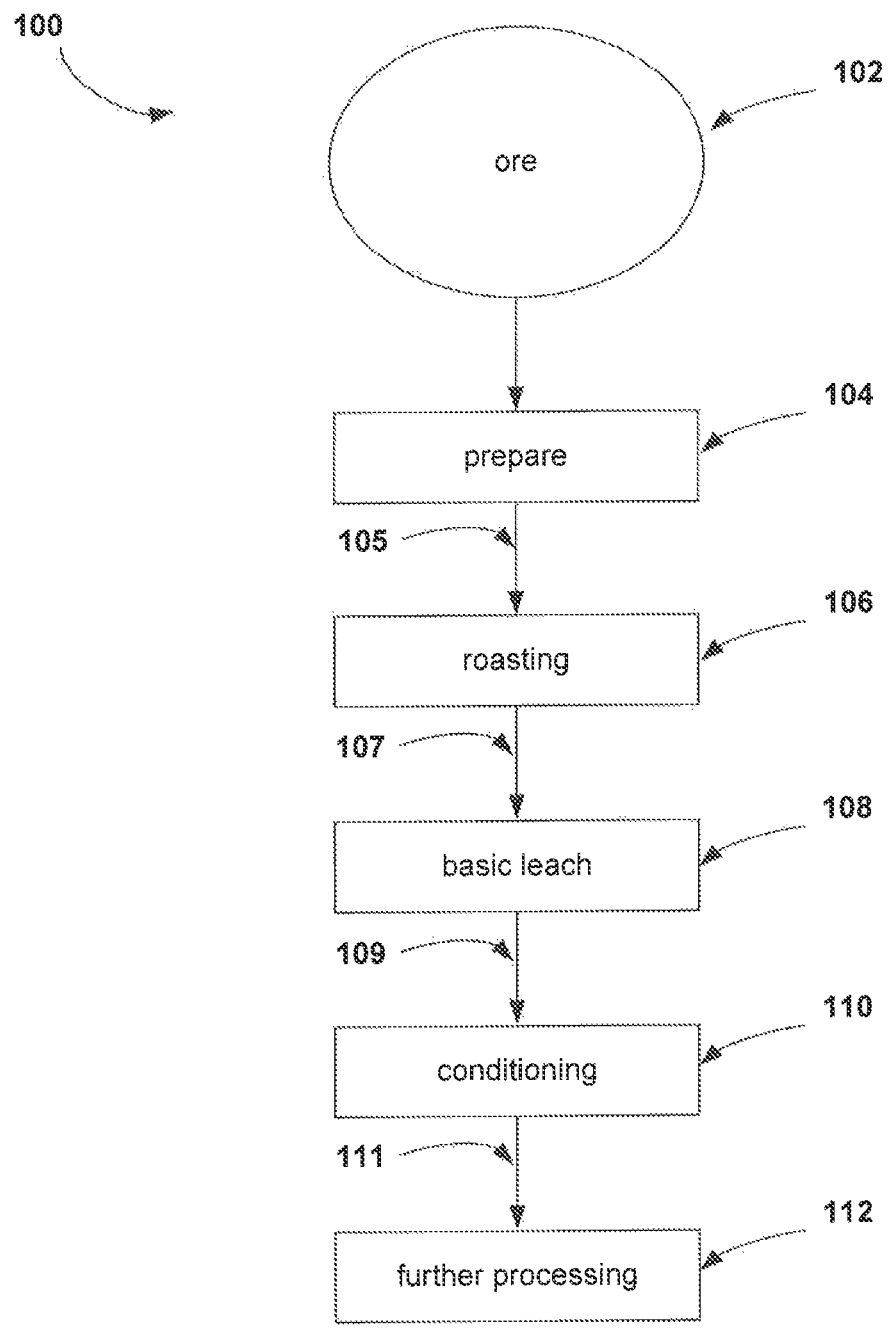
FIG. 1 is a flow diagram illustrating a metal recovery process in accordance with various embodiments of the present invention.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized and that logical and mechanical changes may be made without departing from the spirit and scope of the present invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment The present invention relates, generally, to systems and methods for recovering metal values from metal-bearing materials, and more specifically, to systems and methods for rendering metal-bearing materials either more amenable to acid leaching or other metal recovery process such as solvent extraction. These improved systems and methods disclosed herein achieve an advancement in the art by providing a metal value recovery system that tends to enable significant reduction in the amount of acid required to successfully recover metal values from acid consuming metal-bearing materials.

In particular, it has been discovered that one or more roasts may be combined with a leach in basic media to "preprocess" acid consuming metal-bearing materials for subsequent leaching in acid media. In that regard, in various embodiments, one or more roasts may be combined with a leach in basic media to yield a metal value containing material that is suitable for use in a conditioning process, such as solution extraction. In various embodiments, the subsequent leaching in acid media may be performed with less acid that would have otherwise been needed, reducing operation cost. It is conventionally thought that the use of both basic leaching and acid leaching may lead to undesirable acid-base reactions that would cause dangerous and unproductive situations. However, in accordance with various embodiments, the present inventors have found systems and methods for the use of both basic leaching and acid leaching in the same metal recovery process to reduce the amount of acid consumed in the acid leaching and minimizing, if not eliminating, the risks associated with undesirable acid-base reactions.

With reference to FIG. 1, a metal recovery process 100 is illustrated according to various embodiments of the present invention. Metal recovery process 100 comprises subjecting ore 102 to preparation 104, one or more roastings 106, basic leach 108, conditioning 110, and further processing 112.

Ore 102 may comprise any metal bearing material, such as an ore, a combination of ores, a concentrate, a process residue, a flotation tailings product, an impure metal salt, combinations thereof, or any other material from which metal values may be recovered. Metal values such as, for example, copper, gold, silver, zinc, platinum group metals, nickel, cobalt, molybdenum, rhenium, uranium, rare earth metals, and the like may be recovered from ore 102 in accordance with various embodiments of the present invention. Various aspects and embodiments of the present invention, however, prove especially advantageous in connection with the recovery of copper from highly acid consuming ores that include copper carbonates, such as azurite and malachite, among other highly acid consuming minerals which may be hosted in acid consuming gangue minerals. Highly acid consuming ores may comprise any metal bearing material that requires a high ratio or acid to metal bearing material volume to leach a commercially significant proportion of the metal values in the metal bearing material. In various embodiments, ore 102 comprises at least copper and cobalt and/or compounds comprised of copper and/or cobalt.

Preparation 104 may include any form of preparation for ore 102 prior to roasting 106. In various embodiments, preparation 104 is omitted, although various advantages may be derived through the use of preparation 104. Metal bearing materials may be prepared in a variety of ways. Ores may be dried, crushed, pulverized, finely ground, or undergo any combination thereof. Ores may be concentrated to form a metal bearing concentrate. A variety of acceptable techniques and devices for reducing the particle size of the ore 102 are currently available, such as crushers, ball mills, tower mills, ultrafine grinding mills, attrition mills, stirred mills, horizontal mills and the like, and additional techniques may later be developed that may achieve the desired result of increasing the surface area of and exposing mineral surfaces within the material to be processed. In accordance with various embodiments, ore 102 may be prepared in preparation 104 by controlled grinding. For example, a uniform, particle size distribution may be achieved. In accordance with one aspect of the present disclosure, a particle size distribution of approximately 80% particle distribution passing size ($P_{80}$) of about 75 microns may be used, as well as a particle size distribution of approximately 98% particle distribution passing size ($P_{98}$) of about 100 to about 200 microns. In accordance with one aspect of the present disclosure, a particle size distribution of approximately 80% particle distribution passing size ($P_{80}$) of about 74 microns may be used.

However, in various embodiments, a uniform, ultra-fine particle size distribution is not necessary. For example, in various embodiments, a particle size distribution of approximately 80% particle distribution passing size ($P_{80}$) of about 100 microns may be used, and in various embodiments a particle size distribution of approximately 98% particle distribution passing size ($P_{98}$) of about 100 microns may be used. In various embodiments, preparation 104 does not include controlled, super-fine grinding, but does include crushing and grinding to produce larger and/or less uniform particle sizes. For example, preparation 104 may comprise screening ore through a grizzly or other analogous device with about 250 mm openings. Further, preparation 104 may also include a mill operation. Particles having a size of less than about 250 mm can be received by mill operation which then reduces the received particles to a particle size distribution suitable for downstream processing. For example, the mill operation may provide particles having about 80% particle distribution passing size ($P_{80}$) of 100 microns. Other particle sizes described herein may also be useful.

With continued reference to FIG. 1, after ore 102 has been suitably prepared, prepared metal-bearing material 105 may be subjected to one or more roastings 106. Roastings 106 may include one or more roastings under various conditions. A roast may include the elevation of ore 102 to a temperature above ambient temperature, and may occur under ambient gases or may occur under various atmospheres. Moreover, roastings 106 may comprise one or more roasts performed at different temperatures, pressures, and environments, and may be performed in different vessels or physical spaces. For example, a roast may occur under oxygen gas, air, carbon monoxide gas, hydrogen gas, and combinations thereof.

The conditions of roastings 106 may be selected so as to encourage certain chemical processes. For example, a roast may be conducted with a reducing agent to cause one or more species of metal values contained within ore 102 to be reduced. Also for example, a roast may be conducted with an oxidizing agent to cause one or more species of ore 102 to be oxidized. Any type of oxidizing agent or a reducing agent may be used in a roast. An oxidizing agent or a reducing agent used in a roast may be used in any physical state. For example, a gaseous oxidizing agent or a reducing agent may be injected or otherwise introduced to ore 102. However, oxidizing agents and reducing agents or substances from which oxidizing or reducing agents may be generated may also be in liquid or solid form. Roastings 106 yields a roasted metal bearing material. The roasted metal bearing material may be quenched or otherwise treated prior to subsequent processing. Quenching, for example, may be used to reduce the temperature of roasted metal bearing material after a roast is completed. In the case in which the ore has been reduced in the last roasting step, quenching may also serve to limit the re-oxidation of the reduced material.

Roasted metal bearing material 107 may then be leached in basic leach 108. In various embodiments, leaching can employ a leaching apparatus such as for example, a heap leach, a vat leach, a tank leach, a simultaneous grind-leach apparatus, a pad leach, a leach vessel or any other leaching technology, known to those skilled in the art or hereafter developed, that is useful for leaching a metal value from a roasted metal bearing material.

In accordance with various embodiments, leaching may be conducted at any suitable pressure, temperature, and/or gaseous environment under ambient air, or under $N_2$, $O_2$, $SO_2$, CO, or other suitable gases). Leaching can employ one of a high temperature, a medium temperature, or a low temperature, combined with one of high pressure, or atmospheric pressure. Leaching may utilize conventional atmospheric or pressure leaching, for example, but not limited to, low, medium or high temperature pressure leaching. As used herein, the term "pressure leaching" refers to a metal recovery process in which material is contacted with an acidic or a basic solution and oxygen or another gas under conditions of elevated temperature and pressure, though in the context of basic leach 108, a pressure leach would only include leaching using basic media. Medium or high temperature pressure leaching processes are generally thought of as those processes operating under acidic or basic conditions at temperatures from about 120° C. to about 190° C. or up to about 250° C.

In accordance with various aspects, basic leach 108 comprises at least one of a controlled heap leach and a vat leach. A controlled heap leach can be a heap leach that is performed at constant or varying basic pH levels. Basic pH levels may range from about 7 to about 14. Basic leach 108 is performed using basic media. Basic media may comprise a liquid that has a basic pH level. For example, basic media may include an aqueous solution of potassium hydroxide, sodium hydroxide, ammonia, ammonium and/or ammonium containing compounds such as ammonium carbonate and/or ammonium sulfate. One or more metal values from the roasted metal bearing material 107 may be absorbed into the basic media. Basic media that contains metal values from the roasted metal bearing material may be referred to as a pregnant leach solution 109.

In accordance with various embodiments, basic leach 108 comprises an agitated tank leach that may occur in one or more stages. Leach solutions may contain recycled solutions from upstream processes and recovered lixiviant from various processing steps. Fresh lixiviant may also be added. Leaching may occur in several tanks, either co-currently or counter-currently depending on the leach characteristics and kinetics.

In various embodiments, conditioning 110 may be used to condition pregnant leach solution 109 from basic leach 108. Conditioning 110 can be for example, but is not limited to, a crystallization step, a solid liquid phase separation step, an additional leach step, a pH adjustment step, a dilution step, a solvent extraction step, a concentration step, an ion exchange step, a metal precipitation step, a filtering step, a settling step, and the like, as well as combinations thereof. In an exemplary embodiment, conditioning 110 can comprise a crystallization step. Conditioning 110 produces a preprocessed metal bearing material, also referred to as a conditioned metal bearing material 111.

Further processing 112 may receive conditioned metal bearing material 111 and subject it to further metal recovery process or processes, such as an additional leach, a conditioning step, an electrowinning step, a solution extraction step, other like process, and combinations thereof.

Figure 2:
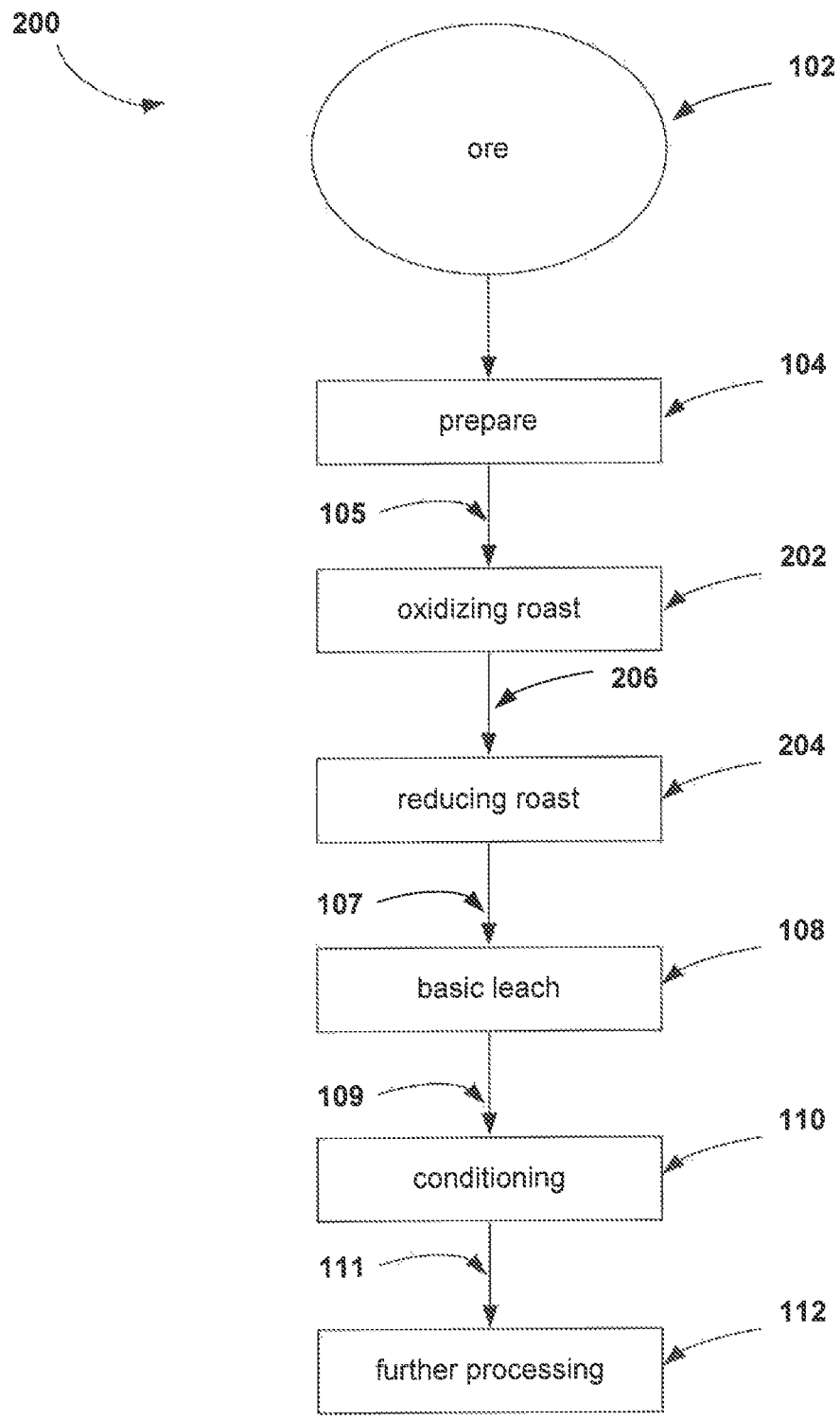
FIG. 2 is a flow diagram illustrating a metal recovery process in accordance with an exemplary embodiment of the present invention that includes an oxidizing roast and a reducing roast.

With reference to FIG. 2, metal recovery process 200 is illustrated. Metal recovery process 200 contains certain steps found in metal recovery process 100, but FIG. 2 illustrates an embodiment where roastings 106 comprises oxidizing roast 202 and reducing roast 204.

Oxidizing roast 202 comprises a roast performed under oxidizing conditions and may be performed using one or more oxidizing agents. For example, oxidizing roast 202 may be performed using air, oxygen gas ($O_2$), ozone ($O_3$), or a combination thereof. Oxygen gas may be injected into the roaster as at least 90% oxygen, preferably gas that is above 95% oxygen, and more preferably above about 99.5% oxygen. The amount of oxidizing agent used is preferably at least an amount needed to react with sulfide minerals and combustible materials that may be present in the ore, plus the amount needed to burn fuels that are added to maintain the desired operating temperature of the roaster in addition to an excess amount to assure that the combustion reactions can reach substantial completion. During oxidizing roast 202, oxygen gas may be injected or otherwise introduced into a roasting vessel. The oxygen gas may be introduced into oxidizing roast 202 until a suitable concentration of oxygen gas is achieved in the roasting vessel.

The temperature of the roasting vessel during oxidizing roast 202 may be adjusted to any suitable roasting temperature. For example, oxidizing roast 202 may be performed at from about 500° C. to about 750° C., more preferably from about 550° C. to about 700° C., and still more preferably at about 625° C. to about 675° C. In various embodiments, oxidizing roast 202 is performed at about 650° C. Oxidizing roast 202 produces oxidized metal bearing material 206. Roasting may be performed in a suitable roasting vessel. For example, oxidizing roast 202 may be performed in a hearth roaster, a rotary kiln, or a fluid bed roaster.

Reducing roast 204 comprises a roast performed under reducing conditions and may be performed using one or more reducing agents. For example, reducing roast 204 may be performed using carbon monoxide gas (CO), hydrogen gas ($H_2$), other suitable reagent, or combinations thereof as a reducing agent. Carbon monoxide gas and/or hydrogen gas may be introduced into the roaster as preferably at least 90% carbon monoxide gas and/or hydrogen gas, preferably at least 95% carbon monoxide gas and/or hydrogen gas, and more preferably, about 100% carbon monoxide gas and/or hydrogen gas. The amount of reducing agent used is preferably at least the amount needed to reduce metal values that may be later recovered (e.g, copper and cobalt) to their elemental metallic form plus an excess portion to assure that the reduction reactions can reach substantial completion. During reducing roast 204, carbon monoxide gas, hydrogen gas, carbon containing solids, and mixtures thereof may be injected or otherwise introduced into a roasting vessel. The carbon monoxide gas or hydrogen gas may be introduced into reducing roast 204 until a suitable concentration of carbon monoxide gas or hydrogen gas is achieved in the roasting vessel.

In various embodiments, hydrogen gas is used as a reducing agent. The principal reaction product of the reducing reaction in the gas phase would be water. Thus, in such embodiments, water may be condensed from the exhaust gas into a liquid phase. The exhaust gas, which may contain hydrogen gas, may then be recycled into the roaster.

Carbon monoxide may be obtained from any suitable source. For example, carbon monoxide may be obtained from the burning of coke. Hydrogen gas may be obtained from any suitable source. For example, hydrogen gas may be produced by fossil fuel reforming. Fossil fuel reforming may comprise reacting steam and a fuel source to produce hydrogen. For example, diesel fuel, natural gas (methane), propane, and gasoline may be used as a fuel for fossil fuel reforming. In addition, fossil fuel reforming may not require a "fossil" fuel per se but a fuel that may be similar to a fossil fuel. For example, in certain circumstances, oils of plants or animals and/or ethanol may be used in addition to or in place of fossil fuels.

The temperature of the roasting vessel during reducing roast 204 may be adjusted to any suitable roasting temperature. For example, reducing roast 204 may be performed at about 400° C. to 625° C., more preferably about 475° C. to about 575° C., and still more preferably at about 500° C. to about 550° C. In various embodiments, reducing roast 204 is performed at about 540° C.

Reducing roast 204 and oxidizing roast 202 may take place in two stage roaster. A two stage roaster may comprise one chamber configured to perform reducing roast 204 and an additional chamber configured to perform oxidizing roast 202. In various embodiments, reducing roast 204 and oxidizing roast 202 may take place in separate roasters.

After either oxidizing roast 202, reducing roast 204, or both, a quenching step may be performed. Quenching provides a transition from the elevated temperatures of roasting to a temperature closer or equal to that of ambient temperature.

Figure 3:
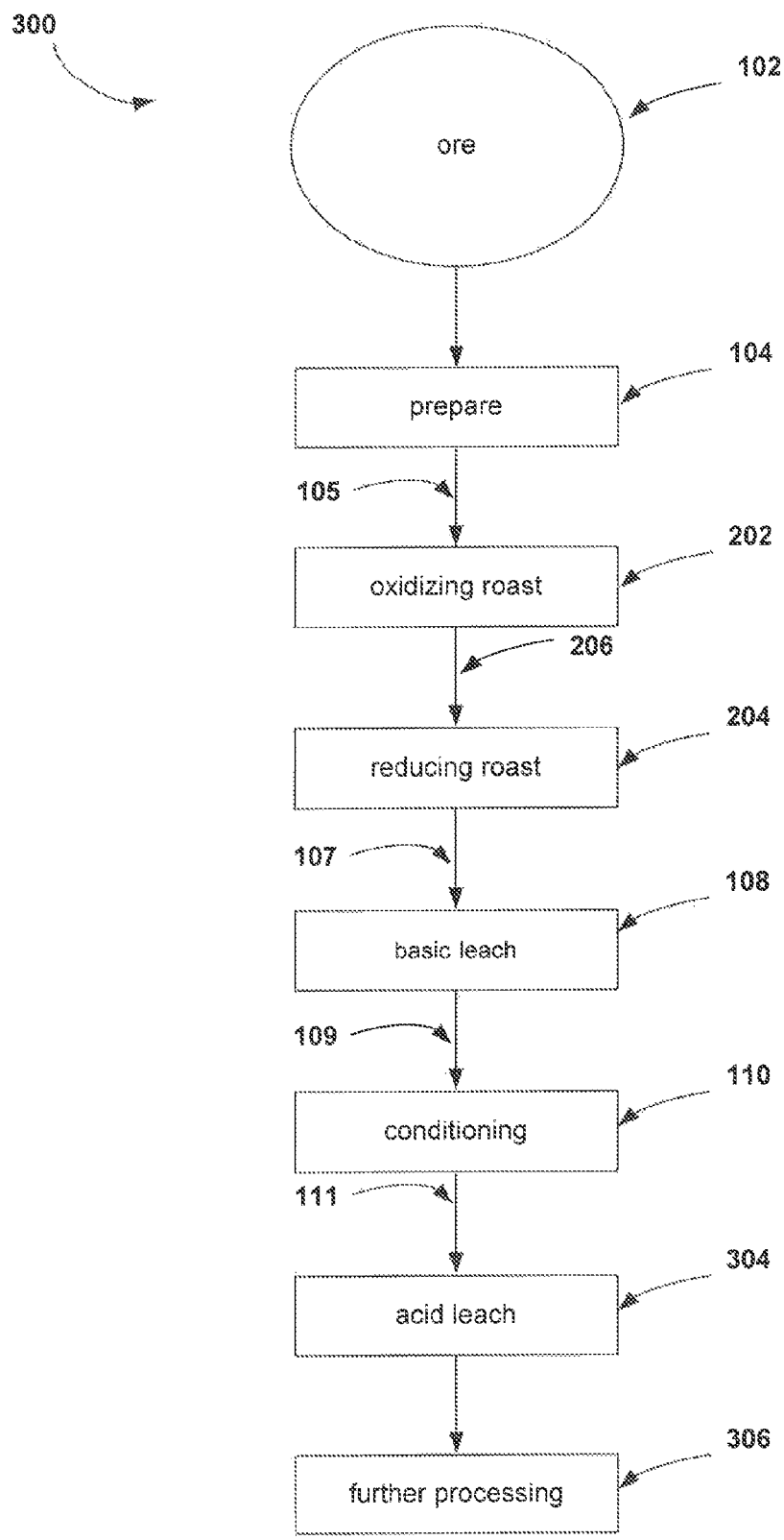
FIG. 3 is a flow diagram illustrating a metal recovery process in accordance with various embodiments of the present invention that includes an acid leach.

With reference to FIG. 3, metal recovery process 300 is illustrated. Metal recovery process 300 contains certain steps found in metal recovery process 200, but FIG. 3 illustrates an embodiment wherein further processing 112 (as illustrated in FIG. 2) comprises acid leach 304 and further processing 306.

Basic leach 108 may comprise any leaching operation that employs basic media. For example, basic leach 108 may comprise a leaching operation where a leaching medium comprising ammonia and/or one or more ammonium containing compounds is used to leach a metal value from a metal bearing material. For example, ammonia and ammonium carbonate, ammonia and ammonium sulfate, or combinations thereof, may be used to leach a roasted metal bearing material. Basic leach 108 may occur at atmospheric pressure, although in various embodiments basic leach 108 occurs at pressures above atmospheric pressure. The duration of basic leach 108 in any particular embodiment depends upon a number of factors, including, for example, the characteristics of the metal bearing material (e.g., roasted metal bearing material), whether pressure above atmospheric pressure is applied, and process temperature. Preferably, the duration of leaching in accordance with various aspects of the present invention ranges from about hours to about 8 hours. More preferably, the duration ranges from about 4 hours to about 7 hours. Metal values are dissolved in the leaching medium to form a pregnant leach solution.

As shown in FIG. 3, further processing 112 comprises acid leach 304 and further processing 306. Acid leach 304 may comprise any leaching operation where a leaching medium comprising an acid is used to leach a metal value from a preprocessed metal bearing material. For example, sulfuric acid may be used to leach a preprocessed metal bearing material. Metal values are dissolved in the acid leaching medium to form an acidic pregnant leach solution. Acid leach 304 may occur at atmospheric pressure, although in various embodiments acid leach 304 occurs at pressures above atmospheric pressure. The duration of acid leach 304 in any particular embodiment depends upon a number of factors, including, for example, the characteristics of the metal bearing material (e.g. roasted metal bearing material), whether pressure above atmospheric pressure is applied, and process temperature. Preferably, the duration of acid leaching in accordance with various aspects of the present invention ranges from about 30 minutes to about 6 hours. The acidic pregnant leach solution may proceed to further metal recovery processes such as further processing 306.

Further processing 306 may comprise any suitable metal recovery process, for example metal recovery processes that yields or whose products may later yield a metal value. For example, further processing 306 may comprise crystallization, solvent extraction and electrowinning, various conditioning steps such as solid liquid phase separations or precipitations, or further leach processes.

Figure 4:
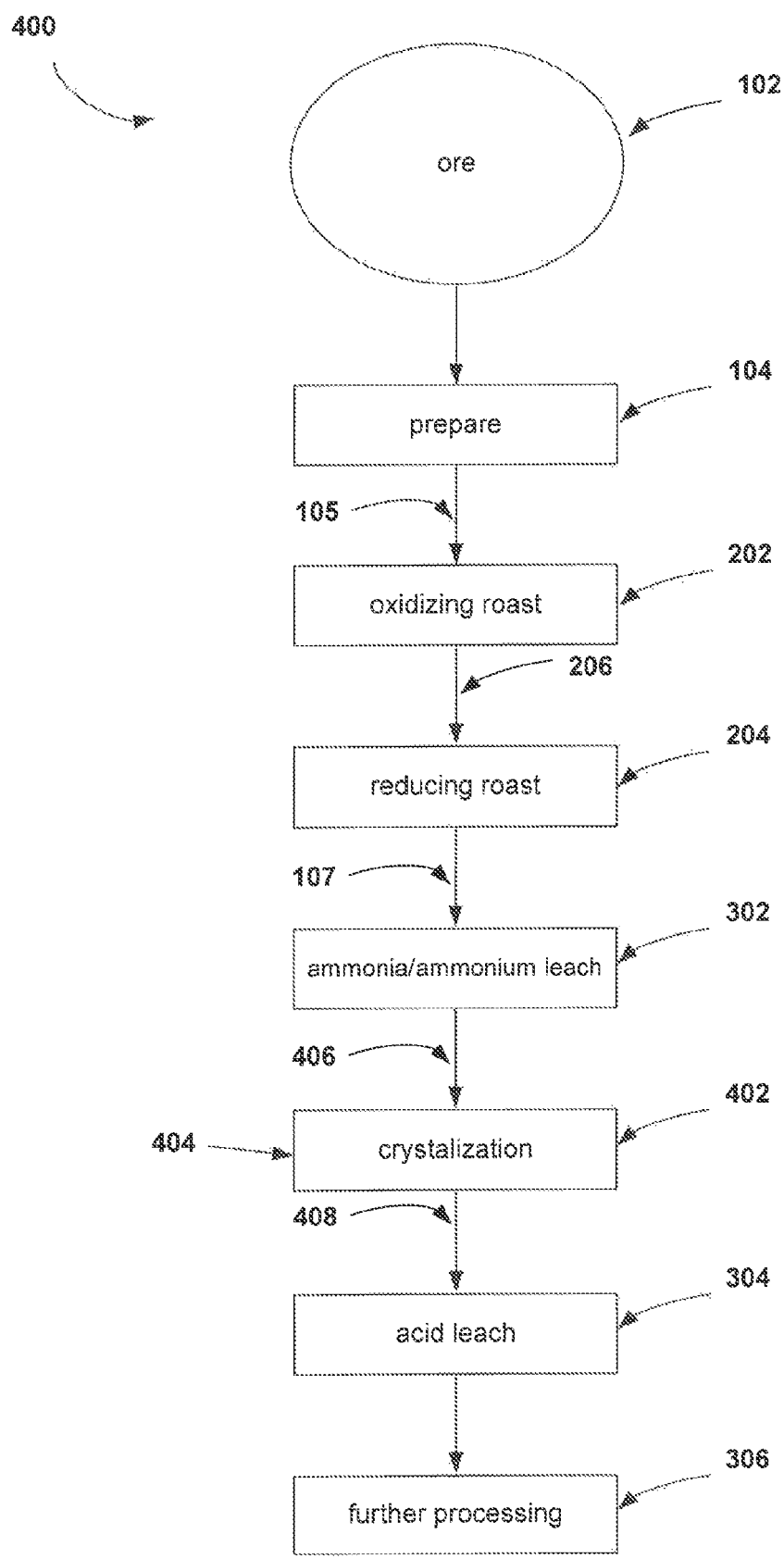
FIG. 4 is a flow diagram illustrating a portion of the process of FIG. 3 illustrating an exemplary embodiment of the present invention that includes a crystallization.

With reference to FIG. 4, metal recovery process 400 is illustrated. Metal recovery process 400 contains certain steps found in metal recovery process 300, but FIG. 4 illustrates an embodiment where conditioning 110 comprises crystallization 402 and seed crystal insertion 404 and where basic leach 108 comprises ammonia/ammonium leach 302.

As described above, conditioning 110 may comprise a crystallization step, such as crystallization 402. Also as described above, it is desirable to minimize or eliminate any undesirable acid base reactions. Crystallization 402 may act to render the pregnant leach solution from ammonia/ammonium leach 302 to be more amenable to acid leach 304 as crystallization 402 assists in the separation of metal bearing materials from basic media.

Crystallization 402 may comprise any crystallization or precipitation process that produces a metal bearing material that is more amenable to acid leach 304 than the pregnant leach solution from basic leach 108 (e.g., from ammonia/ammonium leach 302). For example, crystallization 402 may comprise the precipitation or sequestration of metal values in a solid phase (e.g., a crystal form), allowing the metal values or a subset of the metal values to be separated from basic liquid media 406. The metal bearing solid phase 408 may then be subjected to acid without significant acid base reactions.

Figure 5:
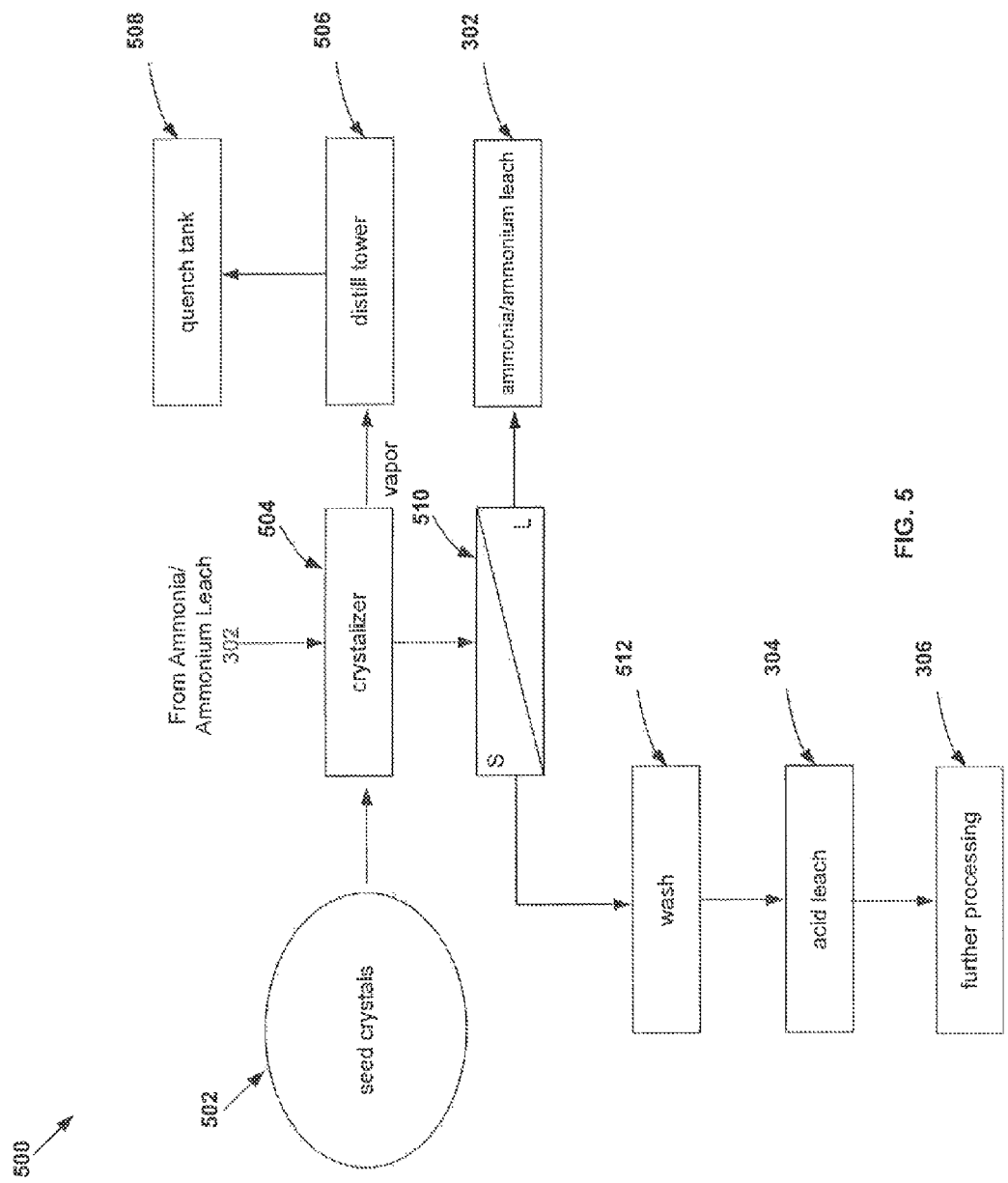
FIG. 5 is a flow diagram illustrating a conditioning process illustrating an exemplary embodiment of the present invention.

An embodiment of crystallization 402 is shown as crystallization 500 of FIG. 5. Crystallizer 504 comprises a vessel that is configured to apply heat to its contents. Crystallizer 504 is configured to be in fluid communication with distillation tower 506. Crystallizer 504 receives the pregnant leach solution from ammonia/ammonium leach 302 and seed crystal insertion 502. Heat may be applied to the pregnant leach solution in crystallizer 504, causing the liquid phase to vaporize and flow into the distillation tower 506. Seed crystal insertion 502 may comprise the addition of metal value containing compounds to form nucleation points within the pregnant leach solution. Metal values within the pregnant leach solution may begin to adhere to the seed crystals and may crystallize into a solid phase. Any metal value containing compound that may cause such nucleation and/or precipitation may be suitable for use in seed crystal insertion 502. In embodiments where the metal values copper and cobalt are present in the pregnant leach solution, copper oxides, cobalt oxides, and copper sulfates may be used to crystallize and/or precipitate copper and cobalt from the pregnant leach solution.

In this manner, crystallizer 504 separates the metal values from basic media, such as ammonia. Distillation tower 506 is configured to be in fluid communication with quench tank 508. Materials in the gaseous phase from distillation tower 506 may condense in distillation tower 506, quench tank 508, or a combination of both.

Solids from crystallizer 504 may be forwarded to solid liquid phase separation 510. Solid liquid phase separation 510, and any solid liquid phase separation in accordance with various embodiments, may be accomplished in a substantially similar manner, or may be accomplished by varying manners. For example, solid liquid phase separation 510 may be accomplished using gravity alone. Also for example, solid liquid phase separation 510 may be accomplished via a centrifuge, a belt separator, an auger separator, or any other suitable method of separating a solid from a liquid, including filtration systems, counter-current decantation (CCD) circuits, thickeners, and the like.

Solids from crystallizer 504 may be washed in wash 512 to form washed solids. Wash 512 comprises a wash using water, although other suitable materials may be used to accomplish a wash of solids from crystallizer 504.

Washed solids comprise metal values. As described above, washed solids are amenable to acid leaching in a manner that is less acid consuming than ore 102. For example, in embodiments where ore 102 comprises copper carbonates, washed solids may comprise metallic copper, copper oxides or copper sulfates, among others. Effective acid leaching of these forms of copper is less acid consuming than, for example, copper carbonates. The acid leaching of washed solids thus reduces the amount of acid used in metal recovery processes and therefore reduces the cost of metal recovery. For example, certain carbonate based ores will consume up to 600 kg or more of sulfuric acid per ton of ore in a conventional acid leach process. Carbonate gangue minerals are not reacted during a ammonia/ammonium leach. Crystallization and acid leaching of selected metal values may reduce the acid required by a factor of 100 in comparison to conventional acid leaching processes. Cost savings are even more significant where metal recovery is conducted in a geographic location where acid is difficult and/or expensive to obtain. In various embodiments, washed solids are forwarded to acid leach 304.

In various embodiments, metal values may be recovered from the acid pregnant leach solution in further processing 306 by, for example, electrowinning, although any metal recovery process may be used. For example, acid pregnant leach solution may be subjected to solvent extraction to remove impurities, yielding a metal value rich solution. One or more of the metal values in the metal value rich solution may be recovered by electrowinning. In various embodiments, copper is recovered from the metal value rich solution by electrowinning. For example, electrowinning may yield copper cathode and lean electrolyte. Lean electrolyte from electrowinning may report back to acid leach 304. Lean electrolyte may be used for stripping operations and/or washing operations in solution extraction circuits.

Figure 6:
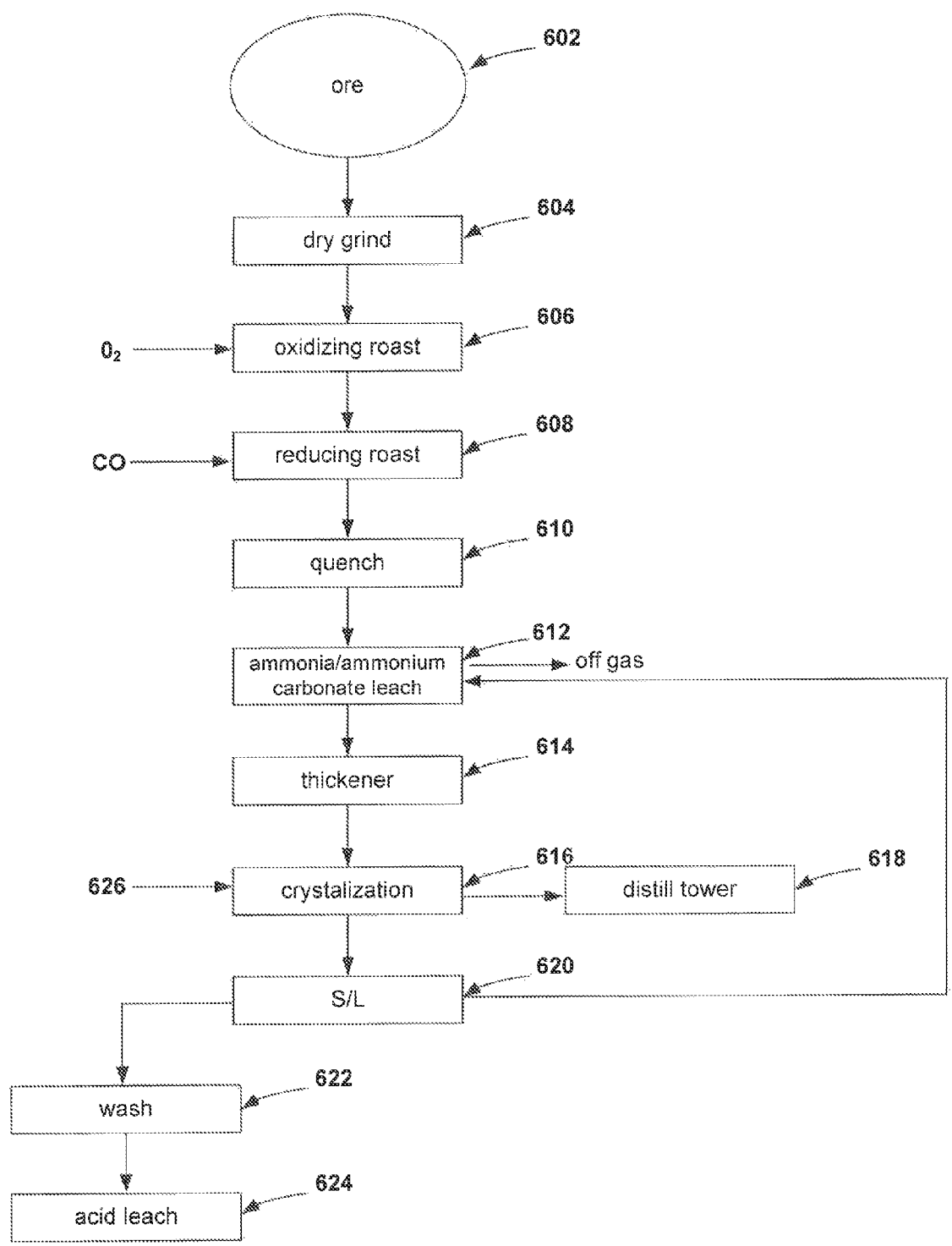
FIG. 6 is a flow diagram illustrating a process in accordance with various embodiments of the present invention.

With reference to FIG. 6, metal recovery process 600 is illustrated in accordance with various embodiments. Metal recovery process 600 includes the processing of highly acid consuming ore 602 into a metal bearing material that is suitable for economically efficient acid leaching.

Highly acid consuming ore 602 is a metal bearing material that includes copper ores and minerals, such as copper carbonates (e.g. azurite and malachite), and may include other metal values such as cobalt.

Highly acid consuming ore 602 is subjected to dry grinding 604. Dry grinding 604 may be performed using a ball mill, tower mill, ultrafine grinding mill, attrition mills, stirred mill, horizontal mill, or the like. Dry grinding 604 is configured to grind highly acid consuming ore 602 to provide particles having about 80% particle distribution passing size ($P_{80}$) of about 100 microns. Dry grinding 604 produces ground ore which is forwarded to oxidizing roast 606.

Oxidizing roast 606 includes a roast of the ground ore to a temperature of about 650° C. under an oxygen gas containing atmosphere. For example, oxidizing roast 606 may be performed using air, oxygen gas ($O_2$), ozone ($O_3$), or a combination thereof. During oxidizing roast 606, oxygen gas may be injected or otherwise introduced into a roasting vessel. The oxygen gas may be introduced into oxidizing roast 606 until a suitable concentration of oxidizing agent oxygen gas is achieved in the roasting vessel.

For example, oxidizing roast 606 may be performed at from about 500° C. to about 750° C., more preferably from about 550° C. to about 700° C., and still more preferably at about 625° C. to about 675° C. In various embodiments, oxidizing roast 606 is performed at about 650° C.

Reducing roast 608 follows oxidizing roast 606. Reducing roast 608 may be performed in the same vessel as oxidizing roast 606, or a different vessel may be used. For example, reducing roast 608 may be performed using carbon monoxide gas (CO), hydrogen gas ($H_2$), other suitable reagent, or combinations thereof as a reducing agent. During reducing roast 608, carbon monoxide gas, hydrogen gas, carbon containing solids, and mixtures thereof may be injected or otherwise introduced into a roasting vessel. The carbon monoxide gas or hydrogen gas may be introduced into reducing roast 608 until a suitable concentration of carbon monoxide gas or hydrogen gas is achieved in the roasting vessel.

Reducing roast 608 includes a roast to a temperature of about 540° C. under a carbon monoxide gas or hydrogen gas containing atmosphere. The carbon monoxide is produced from the burning of coke. Hydrogen is produced from the processing of hydrocarbons. Reducing roast 608 produces roasted ore.

Roasted ore from reducing roast 608 is forwarded to quench 610. Quench 610 includes the reduction in temperature of roasted ore. Quench 610 produces quenched ore, which is forwarded to ammonia/ammonium carbonate and/or ammonium/ammonium carbonate leach 612.

Ammonia/ammonium carbonate leach 612 includes the use of a basic leaching medium comprising ammonia, ammonium carbonate, ammonium sulfate and mixtures thereof to leach the quenched ore. Any suitable source for ammonia or ammonium carbonate may be used for ammonia/ammonium carbonate leach 612, such as ammonia or ammonium carbonate that may be commercially purchased. In addition, ammonia/ammonium carbonate leach 612 may receive liquid from solid liquid phase separation 620. Ammonia/ammonium carbonate leach 612 tends to remove metal values from the quenched ore into the basic leaching medium. The basic leaching medium may be forwarded to thickener 614. Thickener 614 assists in the separation of metal bearing liquor phase and leached solid phases. Thickener liquor is forwarded to crystallization 616.

Crystallization 616 comprises a crystallization or precipitation process that sequesters metal values in a solid phase. Crystallization 616 is performed in a crystallizer, where heat is used to facilitate the migration of vapor to distillation tower 618. Seed crystal insertion 626 comprises the insertion of seed crystals into crystallization 616. For example, metal value oxides and sulfates may be introduced into crystallization 616 to encourage the crystallization of metal values and metal value containing compounds, thus causing the metal values and/or metal value containing compounds to form a solid phase and leaving solution. In various embodiments, copper oxide, copper sulfates, cobalt oxides, and combinations thereof may be used as seed crystals in seed crystal insertion 626. The liquid phase may vaporize and condense in distillation tower 618.

Solid liquid phase separation 620 may further be used to separate the solid and liquid phases of crystallization 616. Liquid from solid liquid phase separation 620 may be recycled to ammonia/ammonium carbonate leach 612. Metal bearing solids from solid liquid phase separation 620 are washed in wash 622 with water to form washed metal bearing material.

Washed metal bearing material comprises metal bearing materials that are more amenable to acid leaching than highly acid consuming ore 602. In various embodiments, washed metal bearing material comprises copper oxide, copper sulfate, and cobalt oxide. Washed metal hearing material may then be subjected to acid leach 624. Acid leach 624 is performed using sulfuric acid.

In accordance with various embodiments, an electrowinning process may make use of an anode that is configured to enable the electrolyte to flow through it. As used herein, the term "flow-through anode" refers to an anode so configured.

Any now known or hereafter devised flow-through anode may be utilized in accordance with various aspects of the present invention. Possible configurations include, but are not limited to, metal wool or fabric, an expanded porous metal structure, metal mesh, multiple metal strips, multiple metal wires or rods, perforated metal sheets, and the like, or combinations thereof. Moreover, suitable anode configurations are not limited to planar configurations, but may include any suitable multiplanar geometric configuration.

While, in various embodiments, anodes may be lead-containing (e.g., Pb—Sn—Ca), preferably, the anode is formed of one of the so-called "valve" metals, including titanium (Ti), tantalum (Ta), zirconium (Zr), or niobium (Nb). The anode may also be formed of other metals, such as nickel, or a metal alloy, intermetallic mixture, or a ceramic or cermet containing one or more valve metals. For example, titanium may be alloyed with nickel (Ni), cobalt (Co), iron (Fe), manganese (Mn), or copper (Cu) to form a suitable anode. Preferably, the anode comprises titanium, because, among other things, titanium is rugged and corrosion-resistant. Titanium anodes, for example, when used in accordance with various aspects of embodiments of the present invention, potentially have useful lives of up to fifteen years or more. Titanium anodes may comprise titanium-clad anodes. Titanium-clad anodes comprise a metal, such as copper, clad in titanium, The anode may also comprise any electrochemically active coating. Exemplary coatings include those that comprise platinum, ruthenium, tantalum, iridium, other Group VIII metals, oxides of the same, and mixtures of the same. Ruthenium oxide, tantalum oxide, and iridium oxide are preferred for use as the electrochemically active coating on titanium anodes when such anodes are employed in connection with various embodiments, in accordance with one embodiment of the invention, the anode is formed of a titanium metal mesh coated with an iridium oxide and/or tantalum oxide-based coating. In such embodiments, the iridium oxide and/or tantalum oxide-based coating may be comprised of multiple layers of iridium oxide and/or tantalum oxide. The multiple layers may comprise iridium oxide and/or tantalum oxide in an amorphous state or a crystalline state. In another embodiment of the invention, the anode is formed of a titanium mesh coated with a rutheium-based oxide coating. Anodes suitable for use in accordance with various embodiments of the invention are available from a variety of suppliers.

In various embodiments, copper electrowinning operations use either a copper starter sheet or a stainless steel or titanium "blank" as the cathode. In accordance with one aspect of an exemplary embodiment, the cathode is configured as a metal sheet. The cathode may be formed of copper, copper alloy, stainless steel, titanium, or another metal or combination of metals and/or other materials. The cathode is typically suspended from the top of the electrochemical cell such that a portion of the cathode is immersed in the electrolyte within the cell and a portion (generally a relatively small portion, less than about twenty percent (20%) of the total surface area of the cathode) remains outside the electrolyte bath. The total surface area of the portion of the cathode that is immersed in the electrolyte during operation of the electrochemical cell is referred to herein, and generally in the literature, as the "active" surface area of the cathode. This is the portion of the cathode onto which copper is plated during electrowinning.

In accordance with various embodiments of the present invention, the cathode may be configured in any manner now known or hereafter devised by the skilled artisan.

In accordance with various embodiments, the copper concentration in the electrolyte for electrowinning is advantageously maintained at a level of from about 2.0 to about 60 grams of copper per liter of electrolyte. Preferably, the copper concentration is maintained at a level of from about 30 to about 50 g/L, and more preferably, from about 40 to about 45 g/L. However, various aspects of the present invention may be beneficially applied to processes employing copper concentrations above and/or below these levels.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A process comprising:
   roasting a metal bearing material under oxidizing conditions to produce an oxidized metal bearing material;
   roasting the oxidized metal bearing material under reducing conditions to produce a roasted metal bearing material;
   leaching the roasted metal bearing material in a basic medium to yield a pregnant leach solution;
   conditioning the pregnant leach solution to form a preprocessed metal bearing material; and
   leaching the preprocessed metal bearing material in acid medium.

2. The process of claim 1, wherein the basic medium comprises at least one of ammonia, ammonium carbonate, and ammonium sulfate.

3. The process of claim 2, wherein the acid medium comprises sulfuric acid.

4. The process of claim 2, wherein the conditioning comprises crystallizing the pregnant leach solution to form the preprocessed metal bearing material and a vapor.

5. The process of claim 1, wherein the oxidizing conditions comprise an oxygen gas containing atmosphere.

6. The process of claim 1, wherein the reducing conditions comprise at least one of a carbon monoxide gas containing atmosphere and a hydrogen gas containing atmosphere.

7. The process of claim 4, further comprising condensing the vapor into a condensate and recycling the condensate into the basic medium.

8. The process of claim 4, further comprising washing the preprocessed metal bearing material with water.

9. The process of claim 4, further comprising adding seed crystals to the pregnant leach solution.

10. The process of claim 5, wherein the oxidizing conditions further comprise a temperature of from about 550° C. to about 700° C.

11. The process of claim 6, wherein the reducing conditions further comprise a temperature of from about 475° C. to about 575° C.

12. The process of claim 1, further comprising grinding a metal bearing ore to yield the metal bearing material.

13. The process of claim 1, wherein the leaching the preprocessed metal bearing material in acid medium yields an acidic pregnant leach solution and further comprising recovering a metal value from the acidic pregnant leach solution.

14. A process comprising:
   oxidizing sulfides of copper by roasting under oxygen gas to produce an oxidized copper bearing material;
   reducing copper by roasting the oxidized copper bearing material under at least one of hydrogen and carbon monoxide to produce a roasted copper bearing material;
   leaching the roasted copper bearing material with ammonia to yield a pregnant leach solution;
   precipitating copper containing compounds from the pregnant leach solution; and
   leaching the copper containing compounds in acid medium.

15. The process of claim 14, further comprising precipitating cobalt containing compounds from the pregnant leach solution.

16. The process of claim 14, wherein the precipitating comprises adding copper containing seed crystals to the pregnant leach solution.

17. The process of claim 14, wherein the acid medium comprises sulfuric acid.

18. The process of claim 14, further comprising washing the copper containing compounds with water.

19. The process of claim 14, wherein the oxidizing occurs at a temperature of from about 550° C. to about 700° C.

20. The process of claim 14, wherein the reducing occurs at a temperature of from about 475° C. to about 575° C.

* * * * *